United States Patent
Yan et al.

(10) Patent No.: US 12,206,512 B2
(45) Date of Patent: Jan. 21, 2025

(54) SCHEDULING ENHANCEMENT FOR ENHANCED MACHINE-TYPE COMMUNICATION

(71) Applicant: Lenovo (Beijing) Ltd., Beijing (CN)

(72) Inventors: Zhi Yan, Xicheng District (CN); Haipeng Lei, Haidian District (CN); Yingying Li, Haidian District (CN); Lianhai Wu, Chaoyang (CN); Jie Shi, Haidian District (CN); Haiming Wang, Xicheng District (CN)

(73) Assignee: Lenovo (Beijing) Ltd., Beijing (CN)

( * ) Notice: Subject to any disclaimer, the term of this patent is extended or adjusted under 35 U.S.C. 154(b) by 347 days.

(21) Appl. No.: 17/640,969

(22) PCT Filed: Sep. 12, 2019

(86) PCT No.: PCT/CN2019/105640
§ 371 (c)(1),
(2) Date: Mar. 7, 2022

(87) PCT Pub. No.: WO2021/046799
PCT Pub. Date: Mar. 18, 2021

(65) Prior Publication Data
US 2022/0345256 A1    Oct. 27, 2022

(51) Int. Cl.
*H04L 1/1867* (2023.01)
*H04L 1/1607* (2023.01)
(Continued)

(52) U.S. Cl.
CPC .......... *H04L 1/1896* (2013.01); *H04L 1/1607* (2013.01); *H04L 1/1812* (2013.01); *H04L 1/1822* (2013.01); *H04L 1/1893* (2013.01)

(58) Field of Classification Search
CPC ... H04L 1/1896; H04L 1/1607; H04L 1/1812; H04L 1/1822; H04L 1/1893
See application file for complete search history.

(56) References Cited

U.S. PATENT DOCUMENTS

2016/0323854 A1* 11/2016 Gao .................. H04L 1/1893
2018/0279167 A1   9/2018 Li et al.
(Continued)

FOREIGN PATENT DOCUMENTS

| CN | 102891743 A | 1/2013 |
|---|---|---|
| CN | 103199965 A | 7/2013 |
| WO | 2018201294 A1 | 11/2018 |

OTHER PUBLICATIONS

"International Preliminary Report on Patentability", PCT Application No. PCT/CN2019/105640, Mar. 24, 2022, 5 pages.
(Continued)

*Primary Examiner* — Edan Orgad
*Assistant Examiner* — Malick A Sohrab
(74) *Attorney, Agent, or Firm* — FIG. 1 Patents

(57) ABSTRACT

Methods and apparatuses for scheduling enhancement for eMTC are disclosed. A method comprises determining a HARQ process number for a transport block (TB), wherein the HARQ process number is determined by at least one of a HARQ process field of a control signal, a fixed HARQ process number, a HARQ process number of earliest scheduled process in a time duration, a HARQ process number of a process with earliest feedback in a time duration, a scrambling code of the TB, and a predefined HARQ process number of a process in an earliest feedback bundle; and transmitting the TB with the determined HARQ process number.

20 Claims, 7 Drawing Sheets

(51) Int. Cl.
*H04L 1/1812* (2023.01)
*H04L 1/1822* (2023.01)

(56) References Cited

U.S. PATENT DOCUMENTS

| | | | | |
|---|---|---|---|---|
| 2020/0037314 A1* | 1/2020 | Xiong | .................... | H04L 1/1812 |
| 2020/0351923 A1* | 11/2020 | Karaki | .................... | H04W 72/23 |
| 2021/0219329 A1* | 7/2021 | Zhou | .................... | H04L 1/1896 |
| 2021/0385843 A1* | 12/2021 | Yu | .................... | H04L 1/1896 |
| 2022/0210802 A1* | 6/2022 | Hwang | .................... | H04L 1/1854 |
| 2022/0368465 A1* | 11/2022 | Wong | .................... | H04L 1/1812 |

OTHER PUBLICATIONS

"International Search Report and Written Opinion", PCT Application No. PCT/CN2019/105640, May 25, 2020, 6 pages.

* cited by examiner

| Subframe# | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| MPDCCH | M | M | M | M | M | M | M | M | M | M | | | | | | | |
| PDSCH | | | D | D | D | D | D | D | D | D | D | D | | | | | |
| PUCCH or PUSCH | | | | | | | | | | | | | | U | U | U | |

588k bps
(1000 bits × 10/17)

No data

Figure 1

| Subframe# | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| MPDCCH | M0 | M1 | M2 | M3 | M4 | M5 | M6 | M7 | M8 | M9 | | | | | | | | M0 | M1 | M2 | M3 | M4 | M5 | M6 |
| PDSCH | | | D0 | D1 | D2 | D3 | D4 | D5 | D6 | D7 | D8 | D9 | | | | | | | | D0 | D1 | D2 | D3 | D4 |
| PUCCH or PUSCH | | | | | | | | | | | | | | U0 | U4 | U8 | | | | | | | | |
| PUCCH or PUSCH | | | | | | | | | | | | | | U1 | U5 | U9 | | | | | | | | |
| PUCCH or PUSCH | | | | | | | | | | | | | | U2 | U6 | | | | | | | | | |
| PUCCH or PUSCH | | | | | | | | | | | | | | U3 | U7 | | | | | | | | | |

TBs in Bundle

AND operation of feedbacks of processes 0 to 3

Figure 2

| Subframe# | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|---|
| MPDCCH | M0 | M1 | M2 | M3 | M4 | M5 | M6 | M7 | M8 | | | | | | M0 | M1 | M2 | M3 | M4 | M5 | M6 | M7 | M8 | | | | | |
| PDSCH | | | D0 | D1 | D2 | D3 | D4 | D5 | D6 | | | | | | | | | D0 | D1 | D2 | D3 | D4 | D5 | D6 | | | | |
| PUCCH or PUSCH | | | | | | | | | | | U0 | U4 | U6 | | | | | | | | | | | | U7 | U2 | U6 | |
| PUCCH or PUSCH | | | | | | | | | | | U1 | U5 | | | | | | | | | | | | | U8 | U3 | | |
| PUCCH or PUSCH | | | | | | | | | | | U2 | | | | | | | | | | | | | | U0 | U4 | | |
| PUCCH or PUSCH | | | | | | | | | | | U3 | | | | | | | | | | | | | | U1 | U5 | | |

N+2 valid DL subframe

Figure 3A

| Subframe# | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| MPDCCH | M0 | M1 | M2 | M3 | M4 | M5 | M6 | M7 | | | | | | | | | M0 | M1 | M2 | M3 | M4 | M5 | M6 | M7 |
| PDSCH | | | D0 | D1 | D2 | D3 | D4 | D5 | | | | | | | | | D6 | D7 | D0 | D1 | D2 | D3 | D4 | D5 |
| PUCCH or PUSCH | | | | | | | | | | | U0 | U1 | U2 | U3 | U4 | U5 | | | | | | | | |

N+2 valid DL subframe

SCHEDULING ENHANCEMENT FOR ENHANCED MACHINE-TYPE COMMUNICATION

FIELD

The subject matter disclosed herein generally relates to wireless communications, and more particularly relates to increasing data rates.

BACKGROUND

The following abbreviations are herewith defined, at least some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Orthogonal Frequency Division Multiplexing (OFDM), Radio Resource Control (RRC), Time-Division Duplex (TDD), Time Division Multiplex (TDM), User Entity/Equipment (Mobile Terminal) (UE), Uplink (UL), Universal Mobile Telecommunications System (UMTS), Worldwide Interoperability for Microwave Access (WiMAX), Internet-of-Things (IoT), Physical Downlink Shared Channel (PDSCH), Physical Uplink Shared Channel (PUSCH), Downlink control information (DCI), machine-type communication (MTC), enhanced MTC (eMTC), MTC Physical Downlink Control Channel (MPDCCH), Hybrid Automatic Repeat reQuest (HARQ), Half-Duplex FDD (HD-FDD), bandwidth limited/coverage enhancement (BL/CE), acknowledgement (ACK), negative acknowledgement (NACK).

FIG. 1 illustrates the principal of eMTC HD-FDD data transmission in a transmission bundle. As shown in FIG. 1, subframes #0 to #16 are a transmission bundle for downlink control signal transmission, downlink data transmission and the corresponding feedback (ACK or NACK) transmission. Each transmission bundle includes downlink (DL) control channel (e.g., MPDCCH), DL data channel (e.g., PDSCH), switching gap between DL and UL, and uplink (UL) feedback channel (e.g., PUSCH or PUCCH). In FIG. 1, "M" is short for MPDCCH, which is control signals; "D" is short for data signals, which is PDSCH data signals; and "U" is short for uplink feedback signal, which is feedback in PUCCH or PUSCH. As shown in FIG. 1, in subframes #0 to #9, control signals can be transmitted in MPDCCH; in subframes #2 to #11, data signals can be scheduled to be transmitted in PDSCH; and in subframes #13 to #15, feedbacks can be scheduled to be transmitted in PUCCH or PUSCH.

For a downlink data transmission process, the following steps are included. First, a control signal (such as DCI) is transmitted in a downlink control channel (e.g. MPDCCH) to schedule data signals transmitted in a downlink data channel (e.g. PDSCH). The data signals are transmitted in a subframe that is 2-subframes later than the subframe in which the control signal is completely transmitted. For example, the control signal transmitted in subframe #0 schedules the data signal transmitted in subframe #2. The data signals are transmitted in unit of TB. One TB is transmitted in one subframe. Afterwards, a feedback (ACK or NACK) is transmitted in a uplink feedback channel (e.g. PUCCH or PUSCH) to indicate whether the corresponding data signal is correctly received or not at the UE side. In particular, one bit is used to indicate whether the data signal in a TB is correctly received at the UE. For example, '1' represents ACK while '0' represents NACK. The subframe(s) to transmit the feedbacks may be determined by the control signal. For example, the feedback subframe for the data signal transmitted in subframe #2 may be configured to subframe #13.

In the above-described steps, each downlink data transmission process is associated with a process number. For example, for process #0, the control signal transmitted in subframe #0 schedules the data signal transmitted in a TB in subframe #2; and the feedback for process #0 is transmitted in subframe #13. The feedback is associated with the process number so that the eNB knows with which TB (or with which subframe) the feedback is associated. The process number may also be referred to as HARQ process number. The maximal HARQ process number is configured by higher layer signaling. For example, the maximal HARQ process number is configured to 10 as shown in FIG. 1.

As shown in FIG. 1, control signals are transmitted, respectively, in subframes #0 to #9. Data signals are transmitted, respectively, in subframes #2 to #11. In particular, each of the scheduled data transmission subframes is 2-subframes later than the corresponding control signal transmission subframe. Therefore, control signal is transmitted in subframe #0 and the corresponding data signal is transmitted in subframe #2; control signal is transmitted in subframe #1 and the corresponding data signal is transmitted in subframe #3; . . . ; and control signal is transmitted in subframe #9 and the corresponding data signal is transmitted in subframe #11.

In case of half duplex FDD eMTC, one subframe is necessary for switching from DL to UL (or from UL to DL). Subframe #12 is used for switching from DL to UL.

Subframes #13 to #15 are used for UL transmission. In particular, subframes #13 to #15 are used to transmit feedbacks (ACK or NACK) for each of data transmissions in subframes #2 to #11.

Subframe #16 is used for switching from UL to DL, as a control signal will be transmitted in the next subframe (i.e. subframe #0 of the next bundle, not shown).

As can be seen from the above, in the first two subframes of each transmission bundle, the UE can't receive data (only control signal in MPDCCH allowed). Therefore, DL peak data rate is restricted. Incidentally, in subframes #10 and #11, i.e. the two subframes before the DL to UL switching subframe (subframe #12) (or three subframes before the first UL subframe (subframe #13)), no control signals are transmitted.

If maximal 1000 bits can be transmitted in one subframe, the data rate for each subframe is 1000 bits×10/17=588 bits per millisecond (i.e. 588 k bps), considering that one subframe is 1 millisecond.

FIG. 1 shows that three subframes (subframes #13 to #15) are used for feedbacks (ACK or NACK) for data signals transmitted in ten previous subframes (subframes #2 to #11). This is achieved by HARQ bundling.

When HARQ bundling is configured, the DL scheduling information contains a DCI field "TBs in Bundle" which holds the number of TBs in a HARQ bundle, e.g. 1 or 2 or 3 or 4. The HARQ bundle is feedback bundle for different HARQ processes corresponding different TBs transmitted in different subframes. As shown in FIG. 2, U0, U1, U2 and U3, corresponding to feedbacks for TB0, TB1, TB2 and TB3 transmitted in subframes #2 to #5 (i.e. D0, D1, D2 and D3, processes #0, #1, #2, #3), are bundled in one HARQ bundle. That is, the feedbacks (ACK or NACK) of 4 TBs (transmitted in subframes #2 to #5) are contained in one HARQ bundle. If 4 TBs are contained in one HARQ bundle, the last HARQ bundle (or at least one of the HARQ bundles) may contain less than 4 TBs, for example, 2 TBs (i.e. U8 and U9) in FIG. 2.

As shown in FIG. 2, HARQ bundle in subframe #13 is a feedback obtained by performing AND operation for the feedbacks of processes #0 to #3. That is, U0 to U3 are feedbacks for D0 to D3, respectively. Each of U0 to U3 is ACK ('1') or NACK ('0'). In subframe #13, one bit that is obtained by U0 AND U1 AND U2 AND U3 is transmitted. Only when all of U0 to U3 are ACK (1), U0 AND U1 AND U2 AND U3=ACK ('1'). When any of U0 to U3 is NACK ('0'), U0 AND U1 AND U2 AND U3=NACK ('0'). Incidentally, HARQ bundle can be supported only in CE mode A without PDSCH repetition.

When HARQ bundling (and/or dynamic ACK timing) is configured by RRC, the HD-FDD DL scheduling information contains a DCI field "HARQ-ACK Delay" which indicates the BL/CE subframes of delay between end of PDSCH and start of feedback. Three bits with two ranges may be configured by a new RRC parameter: Range 1 {4-11} subframes; or Range 2 {4, 5, 7, 9, 11, 13, 15, 17} subframes.

For example, as shown in FIG. 2, D0 is transmitted in subframe #2 while U0 (i.e. feedback for D0) is transmitted in subframe #13. The delay between D0 and U0, which is indicated in control signal in subframe #0 (M0), is 11. On the other hand, D3 is transmitted in subframe #5 while U3 (i.e. feedback for D3) is transmitted in subframe #13. The delay between D3 and U3, which is indicated in control signal in subframe #3 (M3), is 8.

As a whole, in the prior art, the first two subframes of a transmission bundle cannot be used to transmit data signals. It is an object of the present application to propose solutions for enabling transmission of data in the first two subframes.

BRIEF SUMMARY

Methods and apparatuses of the present application are disclosed.

In one embodiment, a method comprises determining a HARQ process number for a transport block (TB), wherein the HARQ process number is determined by at least one of a HARQ process field of a control signal, a fixed HARQ process number, a HARQ process number of earliest scheduled process in a time duration, a HARQ process number of a process with earliest feedback in a time duration, a scrambling code of the TB, and a predefined HARQ process number of a process in an earliest feedback bundle; and transmitting the TB with the determined HARQ process number.

In one embodiment, the HARQ process number is equal to the value indicated by the HARQ process field of the control signal minus a maximal HARQ process number. The time duration may be at least one of a bundle of continuous downlink subframes, a bundle of continuous uplink subframes for feedback, and a bundle of continuous downlink subframes, uplink subframes and switching subframes.

In another embodiment, a bundle of continuous downlink subframes, uplink subframes and switching subframes. The predefined HARQ process number may be the lowest or second lowest or highest HARQ process number of the feedback bundle. The earliest feedback bundle may be the earliest ACK feedback bundle or the earliest ACK feedback bundle with smallest bundle size.

In some embodiment, the HARQ process number determination mechanism is triggered by at least one of a higher layer signaling, an unused state of the HARQ process field of the control signal, the control signal being a first number of subframes before the first uplink subframe, and the HARQ process field of the control signal indicating a HARQ process having no feedback in a time duration.

In some embodiment, when a feedback of a previous TB of the determined HARQ process number is negative acknowledgement, the previous TB with the determined HARQ process number is retransmitted. On the other hand, when a feedback of a previous TB of the determined HARQ process number is acknowledgement, a new TB with the determined HARQ process number is transmitted.

In one embodiment, a base unit comprises a processor that determines a HARQ process number for a transport block (TB), wherein the HARQ process number is determined by at least one of a HARQ process field of a control signal, a fixed HARQ process number, a HARQ process number of earliest scheduled process in a time duration, a HARQ process number of a process with earliest feedback in a time duration, a scrambling code of the TB, and a predefined HARQ process number of a process in an earliest feedback bundle; and a transmitter that transmits the TB with the determined HARQ process number.

In another embodiment, a method comprises determining a HARQ process number for a transport block (TB), wherein the HARQ process number is determined by at least one of a HARQ process field of a control signal, a fixed HARQ process number, a HARQ process number of earliest scheduled process in a time duration, a HARQ process number of a process with earliest feedback in a time duration, a scrambling code of the TB, and a predefined HARQ process number of a process in an earliest feedback bundle; and receiving the TB with the determined HARQ process number.

In yet another embodiment, a remote unit comprises a processor that determines a HARQ process number for a transport block (TB), wherein the HARQ process number is determined by at least one of a HARQ process field of a control signal, a fixed HARQ process number, a HARQ process number of earliest scheduled process in a time duration, a HARQ process number of a process with earliest feedback in a time duration, a scrambling code of the TB, and a predefined HARQ process number of a process in an earliest feedback bundle; and a receiver that receives the TB with the determined HARQ process number.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which:

FIG. 1 is a schematic diagram illustrating a prior art downlink data transmission;

FIG. 2 is a schematic diagram illustrating a HARQ bundling;

FIG. 3A is a schematic diagram illustrating a downlink data transmission according to the first embodiment;

FIG. 3B is a schematic diagram illustrating another downlink data transmission according to the first embodiment;

FIG. 4 is a schematic diagram illustrating a downlink data transmission according to the second embodiment with no remaining HARQ process number;

FIG. 5 illustrates HARQ process number determination according to the fourth, fifth and sixth embodiments;

DETAILED DESCRIPTION

Figure 6:
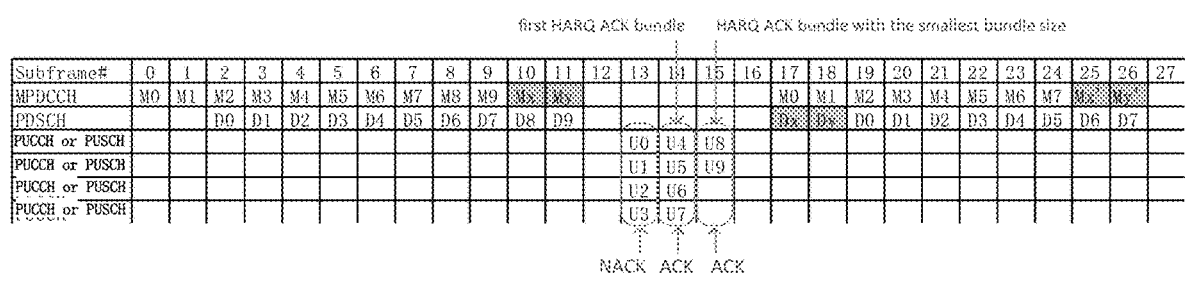
FIG. 6 illustrates HARQ process number determination according to the ninth embodiments.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

The maximal HARQ process number is 10. When HARQ bundling is configured, if the maximal bundle size is 4, three bundles are necessary for transmitting feedbacks. Therefore, a transmission bundle contains seventeen (17) subframes (i.e. subframes #0 to #16 shown in FIG. 2), in consideration that the first two subframes cannot transmit data signals while two subframes are necessary for switching between DL and UL. For example, in FIG. 2, control signals are transmitted in subframes #0 to #9; data signals are transmitted in subframes #2 to #11 (two-subframes later than the corresponding control signals); feedback bundles are transmitted in subframes #13 to #15; while subframes #12 and #16 are for switching between DL and UL.

According to the first embodiment, if the eNB configures the valid DL subframes of subframe #0 to subframe #8 and valid UL subframes of subframe #10 to subframe #12 and the maximal HARQ process number of 10 as shown in FIG. 3A, there are remaining HARQ process numbers for scheduling for the transmission bundle containing subframes #0 to 13. The remaining HARQ process numbers can be used for scheduling data signals transmitted in the first two subframes (of the next transmission bundle).

As shown in FIG. 3A, the transmission bundle contains fourteen subframes (subframes #0 to #13). Only seven (7) subframes (subframes #2 to #8) are used for transmitting data signals. The first two subframes (subframes #0 and #1) are not used for transmitting data signals.

In FIG. 3A, subframe # represents subframe number. M0-M8 represent that MPDCCH is supported in this subframe, in which control signals (e.g. DCI) are transmitted. D0-D6 and D7-D8 represent that PDSCH is supported in this subframe, in which data signals (TBs) are transmitted. U0-U8 represent that PUCCH or PUSCH is supported in this subframe, in which feedback (ACK or NACK) is transmitted.

According to the first embodiment, M7 and M8 (transmitted in subframes #7 and #8) are used for scheduling data signals transmitted in the first two subframes of the next transmission bundle (i.e. subframes #14 and #15 shown in FIG. 3A). Subframes #7 and #8 are the last two DL subframes in the transmission bundle. They are the two subframes before the switching subframe (subframe #9), or three subframes before the first subframe for UL transmission (subframe #10). As can be seen from FIG. 3A, subframes #9 and #13 are for switching between UL and DL and subframes #10 to #12 are for UL transmission. Therefore, if subframe #7 is subframe #N, subframe #14 is #N+2 valid DL subframe.

In addition, as only HARQ process numbers for processes #0 to #6 are used for data signals transmitted in subframes #2 to #8 (i.e. D0 to D6), there are 3 HARQ process numbers remaining for scheduling. Therefore, the first two subframes of the next transmission bundle may use two of the remaining process numbers, such as process numbers #7 and #8, to schedule data signals transmitted in PDSCH separately.

FIG. 3B illustrates another example of the first embodiment in which HARQ bundling is not supported. In FIG. 3B, each feedback for one TB is transmitted in one subframe.

Similar to FIG. 3A, the last two DL subframes (i.e. subframes #6 and #7) are used for scheduling data signals transmitted in the first two subframes of the next transmission bundle (i.e. subframes #16 and #17 shown in FIG. 3B). In FIG. 3B, the maximal HARQ process number is 8.

According to a second embodiment, if there is no remaining HARQ process number for scheduling before the transmission of feedback (ACK or NACK) in a transmission bundle, the first two subframes (of the next transmission bundle) are scheduled in the following manner.

Figures 4, 5:
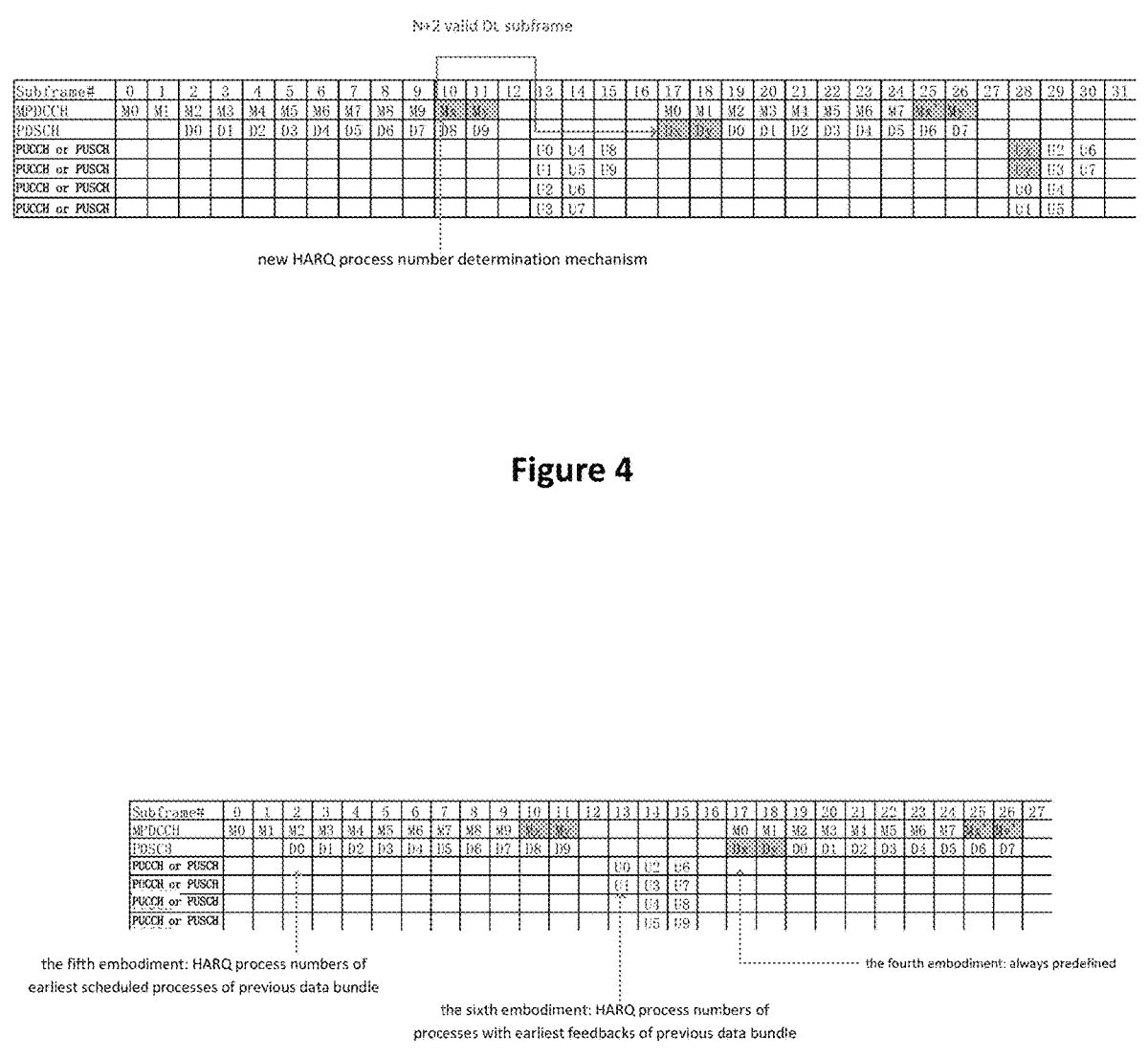

First, a control signal, e.g. DCI, is transmitted in subframe #N in a downlink control channel, e.g. MPDCCH, to schedule data signals transmitted in a downlink data channel, e.g. PDSCH in subframe #N+2. As shown in FIG. 4, M0 to M9 transmitted in subframes #0 to #9 schedule D0 to D9 transmitted in subframes #2 to #11, respectively. Mx and My will be discussed later.

The feedbacks (ACK or NACK) U0-U9 for data signals D0-D9 are transmitted in an uplink feedback channel, e.g. PUCCH or PUSCH, after the transmissions of D0-D9. Note that there is one subframe (subframe #12) for switching from DL to UL between the subframe (subframe #11) in which the last data signal D9 is transmitted and the subframe (subframe #13) in which the first feedback (such as U0) is transmitted. The delay between the transmission of the data signal (each of D0-D9) and the transmission of the feedback to the corresponding data signal (each of U0-U9) is indicated in a DCI field "HARQ-ACK Delay" of the control signal (each of M0-M9).

The subframes in which the control signals schedule data signals transmitted in the first two subframes of the next transmission bundle are two subframes before the switching subframe from DL to UL (or three subframes before the first UL subframe). In particular, as shown in FIG. 4, Mx and My are transmitted in subframes #10 and #11, that are before the switching subframe #12. Mx and My are used to schedule data signals transmitted in first two subframes of the next transmission bundle (subframes #17 and 18 in FIG. 4).

As the maximal HARQ process number is configured to 10, a field of four bits is used to indicate a HARQ process number. Obviously, four bits (e.g. 0000 to 1111) may be used to represent 16 different states. Except for ten (10) used states, e.g. 0000 to 1001, six states (1010 to 1111), that are unused states, are available. Any of the unused states, e.g. any of 1010 to 1111, may be used to indicate that Mx and My are used to schedule data signals transmitted in the #N+2 valid DL subframes, i.e. subframes #17 and #18 (that are the first two subframes in the next transmission bundle). In addition, any of the unused states may indicate that the HARQ process numbers for the processes scheduled by Mx and My would be determined by a new HARQ process number determination mechanism, as all of existing HARQ process numbers are used.

A RRC signaling could be transmitted in advance to the UE to indicate that the new HARQ process number determination mechanism is to be adopted. The new HARQ process number determination mechanism will be discussed later in the third to the ninth embodiments.

Because Mx and My schedule the data signals to be transmitted in the next transmission bundle, no feedback (ACK or NACK) shall be transmitted for these data signals in the current transmission bundle. Therefore, the field of HARQ process in the control signals (e.g. DCI) for Mx and My should be ignored. That is, if the HARQ process field in DCI indicate a process that has no feedback (ACK or NACK), the HARQ process in DCI for said process is ignored. In particular, as shown in FIG. 4, in subframes #13 to #15 for transmitting HARQ feedback, there is no feedback for Dx and Dy scheduled by Mx and My. Incidentally, the feedbacks for Dx and Dy (i.e. Ux and Uy) are transmitted in the next transmission bundle.

As a whole, according to the second embodiment, unused states may be used to schedule data signals transmitted in the first two subframes of the next transmission bundle.

As can be seen from FIG. 4, the "next" transmission bundle includes subframes #17 to #31, in which ten subframes (i.e. #17 to #26) can be used to transmit data signals while the other five (5) subframes are for switching between DL and UL (subframes #27 and #31) and for UL transmission (subframes #28 to #30). Therefore, the data rate for each subframe will be 1000 bits×10/15=667 k bps, that is about +13% more than the data rate in FIG. 1.

The new HARQ process number determination mechanism for determining the HARQ process numbers for the data signals transmitted in the first two subframes of the next transmission bundle are discussed according to the following third to the ninth embodiments.

The UE knows that the HARQ process number determination mechanism for determining the HARQ process numbers would be triggered by at least one of the following situations: a higher layer signaling (e.g. RRC signaling), an unused state of the HARQ process field of the control signal (e.g. any of 1010 to 1111), the control signal being transmitted a first number of subframes (e.g. 3 subframes) before the first uplink subframe or a second number of subframes (e.g. 2 subframes) before the DL to UL switching subframe, and the HARQ process field of the control signal indicating a HARQ process having no feedback in a time duration (e.g. current transmission bundle).

According to a third embodiment, the HARQ process number is determined by the HARQ process field in DCI (control signal). In particular, the HARQ process number is equal to HARQ process filed in DCI minus the maximal HARQ process number. For example, the maximal HARQ process number is 10. Each of the HARQ process fields in DCI for Mx and My may be configured as a different unused state, e.g. 1110 (14) for Mx and 1111 (15) for My. Therefore, the HARQ process number for Mx is 14−10=4 (i.e. 0100), and the HARQ process number for My is 15−10=5 (i.e. 0101). Any of the unused states 10 to 15 (i.e. 1010 to 1111) may be used. Therefore, the HARQ process number determined according to the third embodiment may be any of 0 to 5.

According to a fourth embodiment, the two HARQ process numbers are predefined. For example, they can be fixed as HARQ process number 0 and HARQ process number 1. That is, Dx and Dy shown in FIG. 5 may use the HARQ process number 0 and HARQ process number 1.

According to a fifth embodiment, the two HARQ process numbers are HARQ process numbers of earliest two scheduled processes of previous transmission bundle, e.g. the scheduled HARQ process numbers for D0 and D1. As shown in FIG. 5, D0 and D1 are transmitted in the first two downlink subframes. Note that D0 does not mean that the HARQ process numbers for D0 is always 0 (0000). Any process number (in the condition that the total HARQ process number is 10, any of 0 (0000) to 9 (1001)) may be configured for D0.

According to a sixth embodiment, the two HARQ process numbers are HARQ process numbers of the two HARQ processes with earliest feedbacks, e.g. the scheduled HARQ process numbers for U0 and U1. As shown in FIG. 5, U0 and U1 are transmitted in the first uplink subframe. The feedback timing can be determined by DCI delay in case of HARQ bundling. So, it is not always that the earliest transmitted data signals have the earliest feedback. Any of D0 to D9 may be configured to have the earliest feedback. The HARQ process with earliest feedback of previous transmission bundle has more preparing time for transmission of the next transmission bundle. In addition, as the HARQ bundle may be configured, the eNB may make a restriction that only 2 HARQ processes are contained in the first HARQ bundle. In this condition, the two HARQ process numbers of the two HARQ processes in the first HARQ bundle will be the two HARQ process numbers. As shown in FIG. 5, the first HARQ bundle only includes U0 and U1.

According to a seventh embodiment, the HARQ process number is carried in the transmitted data signals. For example, the transmitted data signals are scrambled by a legacy scrambling code. The initialization value of the legacy scrambling code is determined according to HARQ process number, e.g., HARQID={0, 1, 2, ... 9}.

Any of the following equations (1) and (2) may be used to obtain the initialization value.

$$c_{init}=((n_{RNTI}+\text{HARQID}) \bmod 2^{16}) \cdot 2^{14}+q \cdot 2^{13}+\lfloor n_s/2 \rfloor \cdot 2^9 + N_{ID}^{cell} \quad \text{Equation (1)}$$

$$c_{init}=n_{RNTI} \cdot 2^{14}+q \cdot 2^{13}+((\lfloor n_s/2 \rfloor + \text{HARQID}) \bmod 2^4) \cdot 2^9 + N_{ID}^{cell} \quad \text{Equation (2)}$$

In Equation (1) or (2), $C_{init}$ is initialization value; $n_{RNTI}$ corresponds to the RNTI associated with the PDSCH transmission; HARQID={0, 1, 2, ... 9}; q is antenna port number, ranging from 0 to 3; $n_s$ is slot number, ranging from 0 to 19; and $n_{ID}^{cell}$ is physical cell ID number ranging from 0 to 503.

When the UE receives the scrambled data signals, the UE can blindly decode the scrambling code with the initialization value to obtain the HARQ process number.

According to a variety of the seventh embodiment, the transmitted data signals are scrambled by another scrambling code. The other scrambling code is determined by a HARQ process number. When the UE receives the scrambled data signals, the UE may blindly decode the other scrambling code to obtain the HARQ process number.

According to the seventh embodiment, the UE has to blindly detect all HARQ process numbers, which may lead to high complexity of UE.

In the seventh embodiment, if the UE cannot decode the TB with any possible scrambling code initialized by a particular HARQ process number, the UE may choose (1) drop the TB and clear the buffer; or (2) only buffer the data with one default HARQ process number (e.g., HARQ process number 0).

In the above third to seventh embodiments, several ways of determining HARQ process number are described. In all of these ways, if the feedback of the determined HARQ process number of the previous transmission bundle is NACK, the eNB will retransmit the data signal with the determined HARQ process number in the current transmission bundle. In one transmission bundle, one HARQ process number should be assigned only to one process. Because the determined HARQ process number will be used for retransmission of the data signal with NACK feedback, the determined HARQ process number cannot be used to transmit the data signal in the first or second subframe. Even if data signal with the determined HARQ process number is transmitted in the first or second subframe, the UE will recognize that the data signal transmitted with the determined HARQ process number in the first or second subframe in the current transmission bundle should be ignored because retransmission of "old" data signal is made with the same determined HARQ process number (as "old" data signal is not correctly received in the previous transmission bundle). For example, as shown in FIG. 4, if the feedback U0 for D0 is NACK while the HARQ process number of D0, e.g. 0000, is determined as the HARQ process number of Dx, the UE would recognize that D0 transmitted in subframe #2 will be retransmitted with the same HARQ process number (e.g. 0000) in subframe #19. Therefore, the Dx (even it is transmitted by the eNB in subframe #17), which also use the same HARQ process number 0000, should be ignored by the UE.

On the other hand, if the feedback of the determined HARQ process number of the previous transmission bundle is ACK, the eNB would not retransmit the data signal with the determined HARQ process number in the current transmission bundle. The determined HARQ process number can be used for transmission of data signal in the first or second subframe in the current transmission bundle. Therefore, the UE will recognize that the data signal transmitted with the determined HARQ process number in the first or second subframe in the current transmission bundle is new data signal transmission. For example, as shown in FIG. 4, if the feedback U0 for D0 is ACK while the HARQ process number of D0, e.g. 0000, is determined as the HARQ process number of Dx, the UE would recognize that the Dx, which uses the HARQ process number 0000, is new data signal transmission.

As a whole, it is desirable to determine a HARQ process number that would not be used for retransmission.

According to an eighth embodiment, only HARQ process numbers in HARQ bundle with ACK feedback (referred to as "HARQ ACK bundle" hereinafter) are allowed to be chosen as the HARQ process number. Preferably, the lowest and highest HARQ process numbers or the lowest two HARQ process numbers of the first HARQ ACK bundle are used for the first 2 TBs transmitted in the first two subframes of the next transmission bundle. For example, as shown in FIG. 6, the first HARQ ACK bundle is the bundle for processes #4 to #7. Therefore, the process numbers #4 and #7 (the lowest and highest HARQ process numbers) or the process numbers #4 and #5 (the lowest two HARQ process numbers) can be used as the HARQ process numbers for the first two subframes of the next transmission bundle.

According to a variety of the eighth embodiment, the lowest and the highest HARQ process numbers (or the lowest two HARQ process numbers) of the first or last HARQ ACK bundle with the smallest bundle size are chosen. This is in consideration that the HARQ bundle ACK probability is related to the bundle size. In particular, the bundle size is smaller, the probability of ACK is higher. In this condition, as shown in FIG. 6, the process numbers #8 and #9 may be used as the HARQ process numbers for the first two subframes of the next transmission bundle.

According to a ninth embodiment, only restricted HARQ process numbers, i.e. HARQ process numbers of a particular HARQ ACK bundle, are allowed while HARQ ACK bundle information is carried in data. In particular, the transmitted data signal is scrambled by a legacy scrambling code. The initialization value of the legacy scrambling code is determined according to a HARQ ACK bundle number.

Any of the following equations (3) and (4) may be used to obtain the initialization value.

$$c_{init}=((n_{RNTI}+\text{HARQ ACK bundle ID})\bmod 2^{16})\cdot 2^{14}+q\cdot 2^{13}+\lfloor n_s/2\rfloor\cdot 2^9+N_{ID}^{cell} \quad \text{Equation (3)}$$

$$c_{init}=n_{RNTI}\cdot 2^{14}+q\cdot 2^{13}+((\lfloor n_s/2\rfloor+\text{HARQ ACK bundle ID})\bmod 2^4)\cdot 2^9+N_{ID}^{cell} \quad \text{Equation (4)}$$

In Equation (3) or (4), $C_{init}$ is initialization value; $n_{RNTI}$ corresponds to the RNTI associated with the PDSCH transmission; HARQ ACK bundle ID={0, 1, 2}; q is antenna port number, ranging from 0 to 3; $n_s$ is slot number, ranging from 0 to 19; and $N_{ID}^{cell}$ is physical cell ID number ranging from 0 to 503.

As described above, the HARQ ACK bundle number may be 0 or 1 or 2. The eNB may choose the number of the first HARQ ACK bundle to be carried in the data signal. For example, the number of the first HARQ ACK bundle (from U4 to U7 shown in FIG. 6) may be chosen. Considering that the HARQ bundle ACK probability is related to the bundle size (the smaller the bundle size is, the higher the probability of ACK), the eNB may preferably choose the HARQ ACK bundle with the smallest bundle size, e.g. the HARQ ACK bundle for U8 and U9 shown in FIG. 6.

When the UE receives the scrambled data signals, the UE may blindly decode the scrambling code with the initialization value to obtain the HARQ ACK bundle number. The HARQ process numbers may be determined as two process numbers chosen from the HARQ ACK bundle with the obtained HARQ ACK bundle number. For example, the HARQ process numbers may be determined as the lowest and the highest process numbers (or the lowest two process numbers) of the HARQ ACK bundle with the obtained HARQ ACK bundle number.

According to a variety of the ninth embodiment, the transmitted data signal is scrambled by another scrambling code. The other scrambling code is determined by the HARQ ACK bundle number (either of the first HARQ ACK bundle or of the HARQ ACK bundle with the smallest bundle size). When the UE receives the scrambled data signals, the UE may blindly decode the other scrambling code to obtain the HARQ ACK bundle number. The HARQ process numbers may be determined as two process numbers chosen from the HARQ ACK bundle with the obtained HARQ ACK bundle number.

Figure 7:
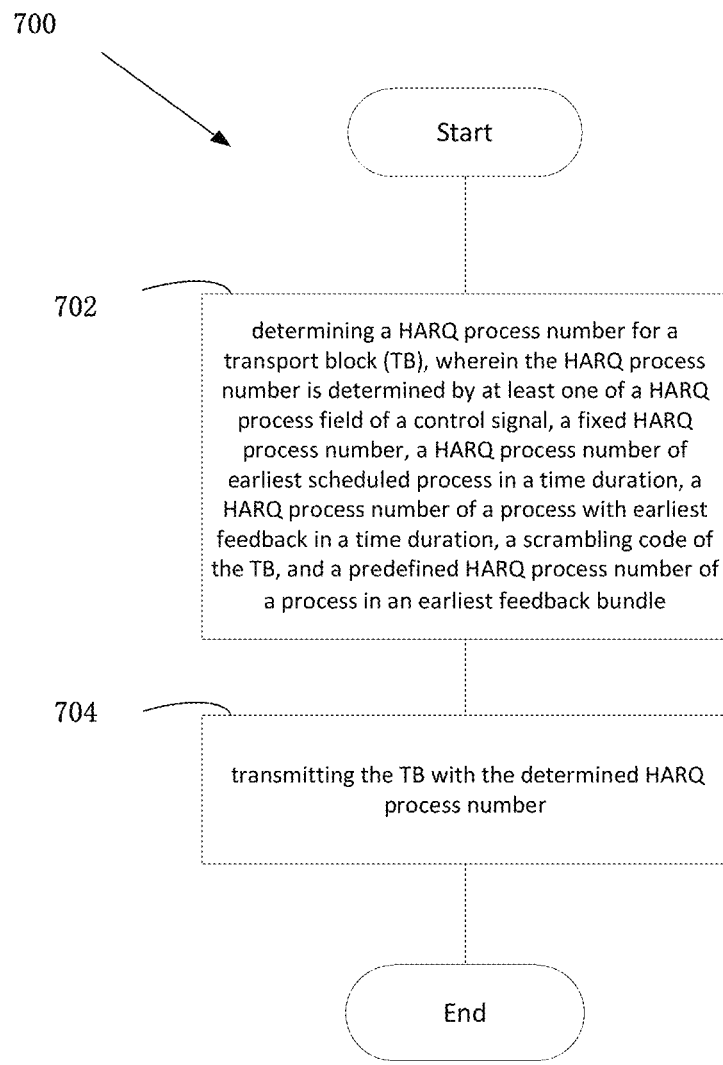
FIG. 7 is a schematic flow chart diagram illustrating an embodiment of a method.

FIG. 7 is a schematic flow chart diagram illustrating an embodiment of a method 700 according to the present application. In some embodiments, the method 700 is performed by an apparatus, such as a base unit. In certain embodiments, the method 700 may be performed by a processor executing program code, for example, a microcontroller, a microprocessor, a CPU, a GPU, an auxiliary processing unit, a FPGA, or the like.

The method 700 may include 702 determining a HARQ process number for a transport block (TB), wherein the HARQ process number is determined by at least one of a HARQ process field of a control signal, a fixed HARQ process number, a HARQ process number of earliest scheduled process in a time duration, a HARQ process number of a process with earliest feedback in a time duration, a scrambling code of the TB, and a predefined HARQ process number of a process in an earliest feedback bundle. The method 700 may further include 704 transmitting the TB with the determined HARQ process number.

Figure 8:
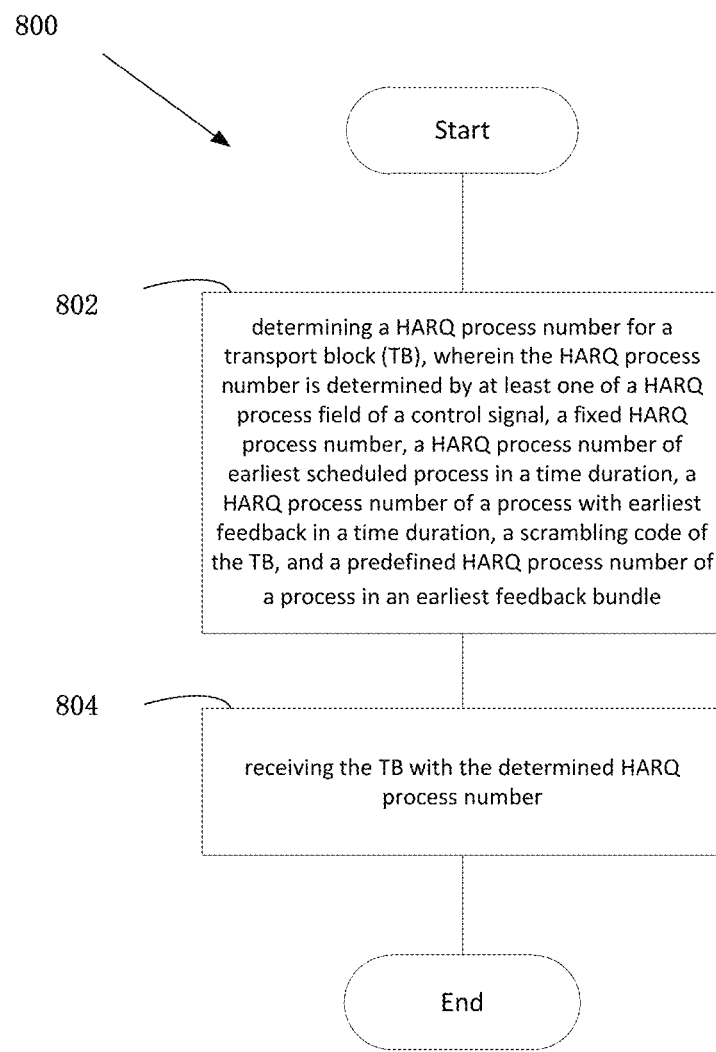
FIG. 8 is a schematic flow chart diagram illustrating a further embodiment of a method.

FIG. 8 is a schematic flow chart diagram illustrating a further embodiment of a method 800 according to the present application. In some embodiments, the method 800 is performed by an apparatus, such as a remote unit. In certain embodiments, the method 800 may be performed by a processor executing program code, for example, a microcontroller, a microprocessor, a CPU, a GPU, an auxiliary processing unit, a FPGA, or the like.

The method 800 may include 802 determining a HARQ process number for a transport block (TB), wherein the HARQ process number is determined by at least one of a HARQ process field of a control signal, a fixed HARQ process number, a HARQ process number of earliest scheduled process in a time duration, a HARQ process number of a process with earliest feedback in a time duration, a scrambling code of the TB, and a predefined HARQ process number of a process in an earliest feedback bundle. The method 80 may further include 804 receiving the TB with the determined HARQ process number.

Figure 9:
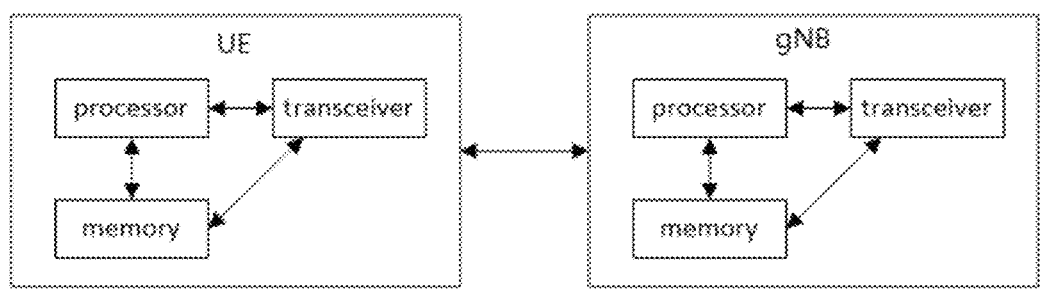
FIG. 9 is a schematic block diagram illustrating apparatuses according to one embodiment.

FIG. 9 is a schematic block diagram illustrating apparatuses according to one embodiment.

Referring to FIG. 9, the UE (i.e. the remote unit) includes a processor, a memory, and a transceiver. The processor implements a function, a process, and/or a method which are proposed in FIG. 8. The eNB (i.e. base unit) includes a processor, a memory, and a transceiver. The processors implement a function, a process, and/or a method which are proposed in FIG. 7. Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a base unit, the method comprising:
   transmitting a transport block (TB) with a hybrid automatic repeat request (HARQ) process number, wherein the HARQ process number is based at least in part on at least one HARQ process number option from a set of HARQ process number options comprising a HARQ process number of an earliest scheduled process in a first time duration, a HARQ process number of a process with earliest feedback in a second time duration, a scrambling code of the TB, and a predefined HARQ process number of a process in an earliest feedback bundle, wherein the HARQ process number is equal to a value indicated by a HARQ process field of a control signal minus a maximal HARQ process number.

2. The method of claim 1, wherein the HARQ process number comprises one of the HARQ process number of the earliest scheduled process in the first time duration or the HARQ process number of the process with earliest feedback in the second time duration, and one or more of the first time duration or the second time duration comprise at least one of:
   a bundle of continuous downlink subframes;
   a bundle of continuous uplink subframes for feedback; or
   a bundle of continuous downlink subframes, uplink subframes, and switching subframes.

3. The method of claim 1, wherein the HARQ process number comprises the scrambling code of the TB, and the scrambling code is determined according to at least one of a HARQ process number or a feedback bundle number.

4. The method of claim 1, wherein the HARQ process number comprises the predefined HARQ process number of the process in the earliest feedback bundle, and the predefined HARQ process number comprises a lowest or second lowest or highest HARQ process number of a feedback bundle.

5. The method of claim 1, wherein the HARQ process number comprises the predefined HARQ process number of the process in the earliest feedback bundle, and the earliest feedback bundle comprises an earliest acknowledgement (ACK) feedback bundle or an earliest ACK feedback bundle with smallest bundle size.

6. The method of claim 1, wherein a HARQ process number determination mechanism is triggered by at least one of:
   a higher layer signaling;
   an unused state of a HARQ process field of a control signal;
   the control signal being a first number of subframes before a first uplink subframe; or
   the HARQ process field of the control signal indicating a HARQ process having no feedback in a time duration.

7. The method of claim 1, wherein, when a feedback of a previous TB of the HARQ process number comprises negative acknowledgement, the method further comprises retransmitting the previous TB with the HARQ process number.

8. The method of claim 1, wherein, when a feedback of a previous TB of the HARQ process number comprises acknowledgement, the method further comprises transmitting a new TB with the HARQ process number.

9. A base unit comprising:
   at least one memory; and
   at least one processor coupled with the at least one memory and configured to cause the base unit to:
   transmit a transport block (TB) with a hybrid automatic repeat request (HARQ) process number, wherein the HARQ process number is based at least in part on at least one HARQ process number option from a set of HARQ process number options comprising a HARQ process number of earliest scheduled process in a first time duration, a HARQ process number of a process with earliest feedback in a second time duration, a scrambling code of the TB, and a predefined HARQ process number of a process in an earliest feedback bundle, wherein the HARQ process number is equal to a value indicated by a HARQ process field of a control signal minus a maximal HARQ process number.

10. The base unit of claim 9, wherein the HARQ process number comprises one of the HARQ process number of the earliest scheduled process in the first time duration or the HARQ process number of the process with earliest feedback in the second time duration, and one or more of the first time duration or the second time duration comprise at least one of:
    a bundle of continuous downlink subframes;
    a bundle of continuous uplink subframes for feedback; or
    a bundle of continuous downlink subframes, uplink subframes, and switching subframes.

11. The base unit of claim 9, wherein the HARQ process number comprises the scrambling code of the TB, and the scrambling code is determined according to at least one of a HARQ process number or a feedback bundle number.

12. The base unit of claim 9, wherein the HARQ process number comprises the predefined HARQ process number of the process in the earliest feedback bundle, and the predefined HARQ process number comprises a lowest or second lowest or highest HARQ process number of a feedback bundle.

13. The base unit of claim 9, wherein the HARQ process number comprises the predefined HARQ process number of the process in the earliest feedback bundle, and the earliest feedback bundle comprises an earliest acknowledgement (ACK) feedback bundle or an earliest ACK feedback bundle with smallest bundle size.

14. The base unit of claim 9, wherein a HARQ process number determination mechanism is triggered by at least one of:
    a higher layer signaling;
    an unused state of a HARQ process field of a control signal,
    the control signal being a first number of subframes before a first uplink subframe; or
    the HARQ process field of the control signal indicating a HARQ process having no feedback in a time duration.

15. The base unit of claim 9, wherein, when a feedback of a previous TB of the HARQ process number comprises negative acknowledgement, the at least one processor is configured to cause the base unit to retransmit the previous TB with the HARQ process number.

16. The base unit of claim 9, wherein, when a feedback of a previous TB of the HARQ process number comprises acknowledgement, the at least one processor is configured to cause the base unit to transmit a new TB with the HARQ process number.

17. A user equipment (UE) comprising:
    at least one memory; and
    at least one processor coupled with the at least one memory and configured to cause the UE to:
    receive a transport block (TB) with a hybrid automatic repeat request (HARQ) process number, wherein the HARQ process number is based at least in part on at least one HARQ process number option from a set of HARQ process number options comprising a HARQ process number of an earliest scheduled process in a first time duration, a HARQ process number of a process with earliest feedback in a second time duration, a scrambling code of the TB, and a predefined HARQ process number of a process in an earliest feedback bundle, wherein the HARQ process number is equal to a value indicated by a HARQ process field of a control signal minus a maximal HARQ process number.

18. The UE of claim 17, wherein the HARQ process number comprises one of the HARQ process number of the earliest scheduled process in the first time duration or the HARQ process number of the process with earliest feedback in the second time duration, and one or more of the first time duration or the second time duration comprise at least one of:
 a bundle of continuous downlink subframes;
 a bundle of continuous uplink subframes for feedback; or
 a bundle of continuous downlink subframes, uplink subframes, and switching subframes.

19. The UE of claim 17, wherein the HARQ process number comprises the scrambling code of the TB, and the scrambling code is determined according to at least one of a HARQ process number or a feedback bundle number.

20. The UE of claim 17, wherein the HARQ process number comprises the predefined HARQ process number of the process in the earliest feedback bundle, and the predefined HARQ process number comprises a lowest or second lowest or highest HARQ process number of a feedback bundle.

* * * * *